United States Patent

Feldtkeller

[15] 3,693,172

[45] Sept. 19, 1972

[54] ARRANGEMENT FOR READING AN ELECTRO-OPTICAL MEMORY

[72] Inventor: Ernst Feldtkeller, Munich, Germany

[73] Assignee: Siemens Aktiengesellschaft, Berlin and Munich, Germany

[22] Filed: Feb. 9, 1971

[21] Appl. No.: 114,004

[30] Foreign Application Priority Data

Feb. 11, 1970 Germany..........P 20 06 167.0

[52] U.S. Cl. .......340/173 LS, 350/160 R, 340/173.2, 340/173 CC

[51] Int. Cl...........................G11c 11/22, G11c 11/42

[58] Field of Search.340/173 LT, 173 LS, 173.2 CC; 350/160 R

[56] References Cited

UNITED STATES PATENTS

| | | | |
|---|---|---|---|
| 3,383,664 | 5/1968 | Chen et al. | 340/173 LS |
| 3,493,937 | 2/1970 | Groschwitz | 340/173 LS |
| 3,544,189 | 12/1970 | Chen et al. | 340/173 LS |
| 3,155,944 | 11/1964 | Oberg et al. | 340/173 LT |
| 3,479,651 | 11/1969 | Bowers | 340/173 LS |

*Primary Examiner*—Stanley M. Urynowicz, Jr.
*Attorney*—Hill, Sherman, Meroni, Gross & Simpson

[57] ABSTRACT

Arrangement for reading an electro-optical memory, in which for the storage of information there is employed the double refraction characteristic dependent on the material state of a storage material and in which for reading linearly polarized light is conducted through the storage material, comprising a beam divider which subdivides the light coming from storer into two partial beams, a first double refracting correction plate whose optical path-length difference is such that in the reading of a binary "O" the light behind the correction plate is polarized approximately linearly, a first analyzer whose plane of polarization is oriented in such a way that in the case of a binary "O" it absorbs linearly polarized light coming from the first correction plate as completely as possible, a first light detector which receives the light coming from beam divider through the first correction plate and the first analyzer, a second double-refracting correction plate whose optical path-length difference is such that in the reading of a binary "1" it absorbs as completely as possible linearly polarized light coming from the second correction plate, a second light detector which receives the light coming from the beam divider through the second correction plate and the second analyzer, and an evaluating circuit to which the output signals of the two light detectors are conducted and which further processes the sign of the difference of the output signals.

8 Claims, 1 Drawing Figure

PATENTED SEP 19 1972 3,693,172
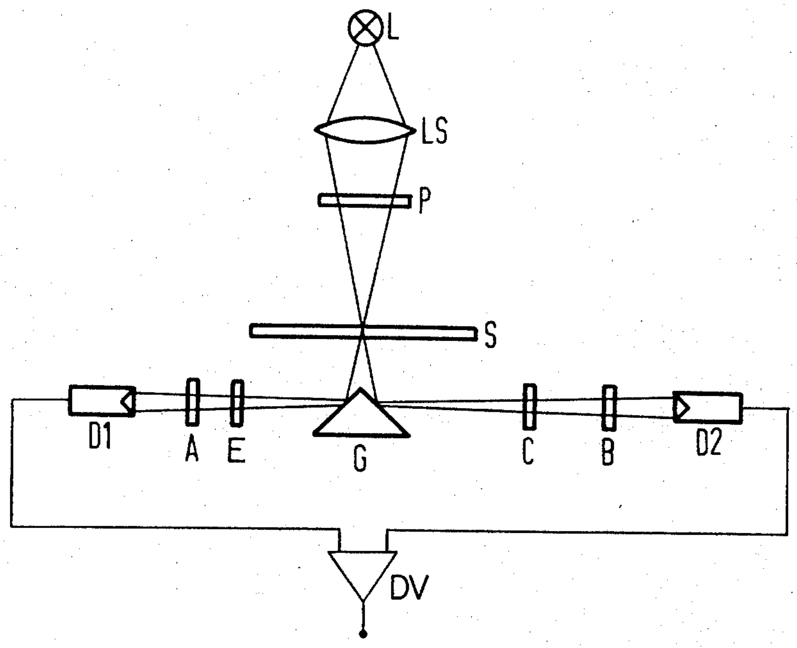
INVENTOR
Ernst Feldtkeller
BY
Hill, Sherman, Meroni, Gross & Simpson
ATTYS.

ARRANGEMENT FOR READING AN ELECTRO-OPTICAL MEMORY

BACKGROUND OF THE INVENTION

1. Field of the Invention

This invention relates to an arrangement for reading an electro-optical memory which employs a double refraction characteristic of storage material for information storage, reading being effected through the utilization of apparatus for conducting a linearly polarized light beam through the storage material and detecting the resulting refraction of the light beam.

2. Description of the Prior Art

It is well known in the art that certain materials become optically double refracting or change their double refraction in the presence of a static electric field. This effect is generally known in the art as the electro-optical Kerr effect. In addition to the foregoing effect due to an applied electric field, double refraction can be caused by an internal field due to an inhomogeneous charge displacement within the material. Furthermore, in ferroelectric materials remanent polarization also evokes double refraction without the application of an electric field. A double refraction can be brought about, for example, in lithium niobate by irradiation (optical damaging).

If a linearly polarized light beam is conducted through double refracting material it becomes generally elliptically polarized. A change of the double refraction therefore causes a change in the ellipticity of the polarization of a light beam which passes therethrough. Linearly polarized light can be almost completely absorbed by an adjustable polarizer; on the other hand, however, elliptically polarized light cannot be so absorbed.

These properties can be advantageously utilized in a memory for storing information by irradiating a material having an artificial double refraction characteristic with a polarized light beam and allocating to the non-double refracting state a binary number, say binary "0", and to the double refraction state the opposite binary number, the binary "1". In order to obtain a readout of information stored in the storage material, it may be irradiated with polarized light and an adjacent light beam analyzer may be set in such a manner so as to extinguish the linearly polarized light (corresponding, say, to a binary "0"), but largely passes the elliptically polarized light.

If the memory system employs storage material with a changeable double refraction characteristic, the system must include a double refraction correction plate disposed between the storage material and the analyzer apparatus to nullify the original double refraction state corresponding, for example, to a binary "0". The light beam passing through the analyzer apparatus is evaluated by a light detector; accordingly, the output signal of the light detector depends upon the electrical material state of the storage medium.

Such a storage system has the disadvantage, however, that only a very low level signal can be obtained at readout. This low level signal is, moreover, subject to considerable fluctuations which are conditioned by time brightness fluctuations of the illumination systems, inhomogenaties of the storage medium, and by noise of output signal amplifiers.

SUMMARY OF THE INVENTION

The present invention has as its primary object the provision of an arrangement for reading an electro-optical memory in which the above-mentioned drawbacks are eliminated and only useful signals are amplified.

According to the invention, the foregoing objective is realized through the provision of an electro-optical memory system in which a beam divider is employed to separate the light beam passing through the storage medium into a pair of light beams, hereinafter called partial light beams. A first double refraction correction plate has an optical path length difference dimensioned in such a way that the light behind the correction plate is linearly polarized in the reading of a binary "0." A first analyzer has a polarization plane which is oriented to absorb as completely as possible linearly polarized light coming from the first correction plate during reading of a binary "0," and a first light detector receives the partial light beam from the beam divider via the first correction plate and the first analyzer. A second double refraction correction plate has an optical path length difference such that during reading of a binary "1" the light behind the second correction plate is polarized approximately linearly. A second analyzer has a polarization which is oriented so as to absorb as completely linearly polarized light from the second correction plate, and a second detector which receives the other partial light beam from the beam divider via the second correction plate and the second analyzer, and an evaluating circuit, which may advantageously include a differential amplifier to receive the output signals from the first and second light detectors and processes the sign (plus or minus) of the difference of the output signals.

With the above arrangement it is provided that, in the case of a stored "0," there impinges on the second analyzer an elliptically polarized light beam which is substantially passed by the analyzer so that the second detector receives a useful signal, while the first detector receives only a smaller interference signal. It is simultaneously provided that, in the case of a stored "1," there impinges upon the first analyzer an elliptically polarized light beam which is substantially passed therethrough so that the first detector receives a useful signal while the second detector receives only a relatively small interference signal. The interference signals super imposed on the useful signals causes light to appear behind the analyzers even when, according to the nature of the information obtained, no light should so appear. The interference signals influence the light beam striking the analyzers in a similar manner so that the signals provided from the light detectors contain an approximately equal interference signal level. If the output signals are supplied to an evaluating circuit for forming a difference, for example, a differential amplifier, the equal interference signals contained in the output signals are eliminated. Only the useful signals are amplified since the difference-forming evaluating circuit delivers during the reading of information of one type a signal of one polarity, and in reading of information of the other type the evaluating circuit delivers a signal of the opposite polarity.

It is also possible, through the utilization of a correction plate disposed in common to both partial beams between the storage medium and the beam divider, to make the light beam in the case of a stored "0" again linearly polarized, and only in the second partial beam to compensate the double refraction change in the storage medium through the use of a second double refracting correction plate so that in the case of a stored "1" the light beam in front of the second analyzer is linearly polarized.

For a case where the storage medium is not double refracting in one of its two states, for example in the case of a stored "0", the system can be somewhat simplified. In such a case the first correction plate may be omitted, as discussed in the following exemplary embodiment and illustrated in the drawings.

BRIEF DESCRIPTION OF THE DRAWING

Other objects, features and advantages of the invention will be best understood from the following detailed description of an exemplary embodiment thereof, taken in conjunction with the accompanying drawing, in which there is a single FIGURE which schematically illustrates an arrangement for reading from an electro-optical storage medium.

DESCRIPTION OF THE PREFERRED EMBODIMENTS

In the drawing, there is designated a storage medium S which consists of a material having a characteristic whereby it becomes double refracting through suitable irradiation, but without irradiation is not double refracting. If a binary "1" is to be written into the storage medium S, then the corresponding storage element is irradiated; if a binary "0" is to be stored, then the corresponding storage element is not irradiated. In order to read this information from a storage element of the storage medium S, a light beam from a light source L is conducted through a lens system LS and through a polarizer P, which polarizes the light beam linearly, and onto the storage medium S.

The light beam may or may not become elliptically polarized in accordance with the stored information, depending upon double refraction state of the storage medium S. The light beam passing through the storage medium S conducted onto a beam divider G, for example a prism, and there split into partial beams. The one partial beam impinges upon a first analyzer A, and the second partial beam is supplied over double refracting correction plate C to a second analyzer B. The light beam passing through the first analyzer A is evaluated by a first light detector D1; the light beam passing through the second analyzer B is evaluated by a second light detector D2. The polarization planes of the analyzers A and B are oriented so as to be perpendicular to the polarization plane of the light supplied to the storage medium S.

If the storage element that is to be read is double refracting, then the light beam passing therethrough is elliptically polarized. The analyzer A is then permeable to the light beam whereat the first light beam detector D1 delivers an output signal. The double refracting correction plate C, however, transforms the elliptical polarized light into linearly polarized light which is not passed by the analyzer B. Since, however, the light beam is influenced by interferences, the detector D2 provides a very weak output signal. If the read storage element is not double refracting, then the right beam remains linearly polarized even after passage through the storage medium S so that the analyzer A still passes only very little light which is caused by interferences. The partial beam applied to the second analyzer B is elliptically polarized by the double refracting correction plate C so that the analyzer B is permeable to light and the light detector D2 delivers a much higher level output signal.

Inasmuch as the light beam is influenced by interferences, also the light intensity behind the analyzers A and B is modified in accordance with the strength of such interferences. This change of light intensity appears, however, in equal measure in both analyzers A and B. Accordingly, also the output signals of the light detectors D1 and D2 are influenced in the same direction by the respective interferences. Since, however, only the sign of the difference signals of the light detectors D1 and D2 is better processed, the change of the output signals caused by the interferences is eliminated.

The outputs of the light detectors D1 and D2 may be connected to an evaluation circuit DV which, as set forth above, may comprise a differential amplifier. Also, another double refracting correction plate E may be interposed between the beam divider G and the analyzer A. When the light behind the storage medium S is elliptically polarized, upon reading a "1" and a "0" the correction plate E reverses the elliptical polarization of the light attributed to the binary "0". The double refracting correction plate therefore functions exactly like the correction plate C.

Many changes and modifications may be made in the invention by one skilled in the art without departing from the spirit and scope of the invention, and it is to be understood that I intend to include the patent warranted hereon all such changes and modifications as may reasonably and properly be included within my scope of my contribution to the art.

What I claim as my invention:

1. An arrangement for reading from an electro-optical memory in which information is stored in accordance with a double refracting characteristic and in which a first elliptically polarized light beam from a light source via the storage medium represents one binary state and a second elliptically polarized light beam from the light source via the storage medium represents the other binary state comprising: a beam divider for forming first and second partial beams; a first double refracting correction plate for receiving said first partial beam and converting said first partial beam to linearly polarized light when the one binary state is read and passing elliptically polarized light when the second binary state is read; a second double refracting correction plate for receiving the second partial beam and converting said second beam to linearly polarized light when the second binary state is read and passing elliptically polarized light when the first binary state is read; a first beam analyzer to receive said first partial beam and operable to pass elliptically polarized light and absorb linearly polarized light; a second beam analyzer to receive said second partial beam and operable to pass elliptically polarized light and absorb linearly polarized light; first and second light detectors for receiving elliptically polarized light from respective first and second analyzers and operable to produce respective output signals in response to light detection; and an evaluation circuit connected to said light detectors for determining the difference of said output signals as a sign corresponding to the information stored in said storage medium.

2. The arrangement according to claim 1, wherein said evaluation circuit comprises a differential amplifier.

3. The arrangement according to claim 1, wherein said second correction plate is disposed between said beam divider and said second analyzer.

4. The arrangement according to claim 1, wherein said first correction plate is disposed between said beam divider and said first analyzer.

5. The arrangement according to claim 1, wherein said first correction plate is disposed between the storage medium and said beam divider.

6. The arrangement according to claim 1, wherein said first and second analyzers each have a polarization plane that is at a right angle to the polarization plane of the light beam supplied to the storage medium.

7. An arrangement for reading from an electro-optical memory comprising: a source of a linearly polarized light beam; a storage medium to conduct said light beam and having a double refracting state and a non-double refracting state, the light beam becoming elliptically polarized in response to the double refracting state and remaining linearly polarized in response to the non-double refracting state; a beam divider to divide the beam into first and second partial beams; first and second beam analyzers for receiving the respective first and second partial beams and effective to absorb linearly polarized light and pass elliptically polarized light; first and second respective light detectors operable to provide output signals in response to detection of light from said light analyzers; a double refracting correction plate interposed between said beam divider and said second beam analyzer for converting the polarization of said second partial light beam to the other polarization; and an evaluation circuit connected to said light detectors to provide a signal having a sign corresponding to the state of the storage medium.

8. The arrangement according to claim 7, wherein said evaluating circuit comprises a differential amplifier connected to said detectors.

* * * * *